(12) United States Patent
Revel et al.

(10) Patent No.: US 9,403,240 B2
(45) Date of Patent: Aug. 2, 2016

(54) METHOD FOR THE BRAZING OF PARTS MADE FROM A COMPOSITE MATERIAL, INCORPORATING A SLUG IN THE BOND

(71) Applicants: HERAKLES, Le Haillan (FR); Commissariat à l' énergie atomique et aux énergies alternatives, Paris (FR)

(72) Inventors: Thomas Revel, Bordeaux (FR); Eric Conete, Merignac (FR); Eric Philippe, Merignac (FR); Guilhem Roux, Saint Egreve (FR); Philippe Bucci, Engins (FR)

(73) Assignees: HERAKLES, Le Haillan (FR); COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/415,348
(22) PCT Filed: Jul. 12, 2013
(86) PCT No.: PCT/FR2013/051672
   § 371 (c)(1),
   (2) Date: Jan. 16, 2015
(87) PCT Pub. No.: WO2014/013166
   PCT Pub. Date: Jan. 23, 2014

(65) Prior Publication Data
   US 2015/0174703 A1    Jun. 25, 2015

(30) Foreign Application Priority Data

Jul. 18, 2012 (FR) .................................... 12 56949

(51) Int. Cl.
   *B23K 31/02* (2006.01)
   *C04B 37/00* (2006.01)
   (Continued)

(52) U.S. Cl.
   CPC ............... *B23K 31/02* (2013.01); *B23K 1/0008* (2013.01); *B23K 1/19* (2013.01); *B23K 1/20* (2013.01);
   (Continued)

(58) Field of Classification Search
   CPC .. B23K 1/20; B23K 2201/14; B23K 2203/16; B23K 1/0008; B23K 1/008; B23K 1/08; B23K 1/19; B23K 1/206; B23K 20/021; B23K 20/233; B23K 2201/18; B23K 2201/20; B23K 2203/10; B23K 31/02; B23K 35/02
   See application file for complete search history.

(56) References Cited

U.S. PATENT DOCUMENTS

| 5,975,407 A | 11/1999 | Gasse et al. |
| 7,497,918 B2 | 3/2009 | Thebault et al. |

(Continued)

FOREIGN PATENT DOCUMENTS

| EP | 0 806 402 | 11/1997 |
| JP | 10-061622 | 3/1998 |

(Continued)

OTHER PUBLICATIONS

International Search Report as issued for PCT/FR2013/051672.

*Primary Examiner* — Erin Saad
(74) *Attorney, Agent, or Firm* — Pillsbury Winthrop Shaw Pittman LLP

(57) ABSTRACT

A method of assembling together by brazing first and second parts made of composite material, each of the first and second parts having an assembly face for brazing with the assembly face of the other part, the method including making at least one perforation in the assembly face of the first part; interposing capillary elements between the assembly faces of the first and second parts made of composite material; placing the first and second parts facing each other while inserting a peg in each perforation of the first part; placing a brazing composition in contact with a portion of the capillary elements; and applying heat treatment to liquefy the brazing composition so as to cause the molten brazing composition to spread by capillarity between the assembly faces of the composite material parts.

10 Claims, 4 Drawing Sheets

(51) Int. Cl.
*B82Y 30/00* (2011.01)
*B23K 1/00* (2006.01)
*B23K 1/19* (2006.01)
*B23K 1/20* (2006.01)

(52) U.S. Cl.
CPC .............. *B82Y 30/00* (2013.01); *C04B 37/005* (2013.01); *C04B 37/006* (2013.01); *B23K 2001/12* (2013.01); *C04B 2235/5288* (2013.01); *C04B 2235/616* (2013.01); *C04B 2237/06* (2013.01); *C04B 2237/062* (2013.01); *C04B 2237/064* (2013.01); *C04B 2237/083* (2013.01); *C04B 2237/086* (2013.01); *C04B 2237/12* (2013.01); *C04B 2237/16* (2013.01); *C04B 2237/365* (2013.01); *C04B 2237/38* (2013.01); *C04B 2237/385* (2013.01); *C04B 2237/62* (2013.01); *C04B 2237/64* (2013.01); *C04B 2237/68* (2013.01); *C04B 2237/84* (2013.01); *C04B 2237/86* (2013.01)

(56) References Cited

U.S. PATENT DOCUMENTS

2002/0042994 A1\* 4/2002 Ito et al. ...................... 29/890.1
2008/0190552 A1 8/2008 Bouillon et al.

FOREIGN PATENT DOCUMENTS

WO WO 2011/029785 3/2011
WO WO 2011/113760 9/2011

\* cited by examiner

METHOD FOR THE BRAZING OF PARTS MADE FROM A COMPOSITE MATERIAL, INCORPORATING A SLUG IN THE BOND

CROSS REFERENCE TO RELATED APPLICATIONS

This application of the U.S. National Stage of PCT/FR2013/051672 filed Jul. 12, 2013, which in turn claims priority to French Application No. 1256949, filed Jul. 18, 2012. The contents of both applications are incorporated herein by reference in their entirety.

BACKGROUND OF THE INVENTION

The invention relates to using brazing to assemble together thermostructural composite materials, and in particular ceramic matrix composite (CMC) materials. CMC materials are typically formed by a porous substrate, such as a porous fiber substrate, that has been densified by a ceramic matrix. The fibers of the substrate may be made of carbon or of ceramic. By way of example, the matrix may be made of a refractory ceramic such as a refractory carbide, nitride, boride, or oxide. CMC materials, such as for example C/SiC composite materials (carbon fiber reinforcement with a silicon carbide matrix), are remarkable for their mechanical properties, which make them suitable for constituting structural elements, and for their ability to conserve those properties at high temperatures.

When making structures out of ceramic matrix composite materials, it is common to construct them from independent elements made of CMC materials, which elements are assembled together by brazing. Nevertheless, brazing ceramic matrix composite materials together is technically difficult, and the breaking stress of the brazed joint is often insufficient relative to the forces to which the assembly might be subjected, in particular shear forces.

Pieces made of CMC materials present a high degree of surface roughness, which prevents the brazing composition spreading well in the zone where the brazed joint is formed, thereby creating zones of weakness in the brazed connection.

Also, while the brazing composition is diffusing between the assembly faces of the parts to be brazed together, gas is given off due to reactions between the brazing composition and the ceramic particles used for conveying the brazing composition by capillarity between the assembly faces. Some of that gas becomes imprisoned inside the brazed joint, thereby leading to a brazed joint that is porous, and in which there remain local braze-free areas between the two surfaces. That lack of material leads to defects in the connection between the two parts, and consequently degrades the quality of the assembly by weakening the connection that is made.

OBJECT AND SUMMARY OF THE INVENTION

An object of the invention is to provide a method that enables composite material parts to be assembled together by brazing, but without the above-specified drawbacks, and that makes it possible in particular to make brazed connections having improved mechanical strength against shear forces.

This object is achieved with a method of assembling together by brazing first and second parts made of composite material, each of the first and second parts having an assembly face for brazing with the assembly face of the other part, the method comprising the following steps:

making at least one perforation in the assembly face of the first part;

interposing capillary elements between the assembly faces of the first and second parts made of composite material;

placing the first and second parts facing each other while inserting a peg in each perforation of the first part;

placing a brazing composition in contact with a portion of the capillary elements; and applying heat treatment to liquefy the brazing composition so as to cause the molten brazing composition to spread by capillarity between the assembly faces of the composite material parts.

Thus, by inserting a peg in at least one perforation present in at least one of the two composite material parts, it is possible to anchor the brazed joint securely in the material of the part and to reinforce significantly the strength of the brazed connection, in particular in shear.

The perforation formed in the assembly face of one or both parts for assembling together may optionally open out in the face opposite from the assembly face.

In a first aspect of the invention, clearance is provided between the inside wall of each perforation and the outside wall of the peg inserted in the perforation. The presence of such clearance enables degassing to take place during the brazing cycle, with gas being evacuated via the end of the or each perforation that opens out outside the assembly faces.

Also, the presence of brazing in the perforation(s) may be checked merely by visual inspection from the face into which the perforation(s) open(s) out. Specifically, partial or complete absence of brazing in the clearance present between a peg and a perforation indicates that the brazed joint has not been formed in uniform manner over the entire brazing zone and that the connection might then include zones of weakness.

In a second aspect of the invention, at least one first perforation is formed in the assembly face of the first part, while a second perforation is formed in the assembly face of the second part. The first and second perforations are brought into alignment when the first and second parts are caused to face each other, a peg being inserted in the first and second perforations.

In a third aspect of the invention, the second composite material part includes a peg on its bonding face, the peg being inserted in the perforation of the first part when the first and second parts are placed facing each other. Under such circumstances, the peg may be machined directly on the bonding face of the second part.

In a fourth aspect of the invention, each peg is made out of a material similar to the composite material of the first and second parts. The term "similar" is used of a material to mean either the same material as the material of the first and second parts, or a material having a coefficient of thermal expansion that differs from the coefficient of thermal expansion of the composite material of the first and second parts by no more than 40%.

In a fifth aspect of the invention, a plurality of grooves are also made in the assembly face of at least one of the two composite material parts, at least some of said grooves opening out into one or more faces adjacent to the assembly face of the part.

In a sixth aspect of the invention, a plurality of orifices are also made in the assembly face of at least one of the two composite material parts, at least some of said orifices opening out into the face opposite from the assembly face of the part.

Thus, by the presence of grooves and/or orifices in at least one of the assembly faces of the composite material parts, additional brazed-joint anchor portions can be formed in the material of the part. In addition, the grooves and/or orifices form additional paths in the parts for degassing and for inspecting the brazed joint.

In a seventh aspect of the invention, the capillary elements are selected from at least one of the following elements: particles of SiC, a web of SiC, a mat of carbon, particles of carbon, and nanotubes of carbon.

In an eighth aspect of the invention, the composite material parts for assembling together by brazing are afterbody parts of an aeroengine.

In a ninth aspect of the invention, the brazing composition is a metallic composition.

BRIEF DESCRIPTION OF THE DRAWINGS

Other characteristics and advantages of the invention appear from the following description of particular implementations of the invention, given as nonlimiting examples, and with reference to the accompanying drawings, in which.

DETAILED DESCRIPTION OF EMBODIMENTS

The brazing assembly method of the present invention applies to any type of thermostructural ceramic matrix composite (CMC) material, i.e. to any material made up of refractory fiber reinforcement (carbon fibers or ceramic fibers) densified by a ceramic matrix that is also refractory, such as C/SiC, SiC/SiC, C/C-SiC, etc. materials. This method also applies to other types of materials that give off gas during brazing, such as C/C materials or monolithic ceramics such as SiC, SiSiC, vitreous carbon, or pyrolytic carbon.

In accordance with the invention, the brazed connection formed by the method of the invention is reinforced by inserting at least one peg in a perforation made in one or both of the parts for assembling together.

With reference to FIGS. 1A to 1E, an implementation of a method in accordance with the invention for assembling together two CMC material parts 10 and 20 by brazing comprises the following steps.

Figure 1A:
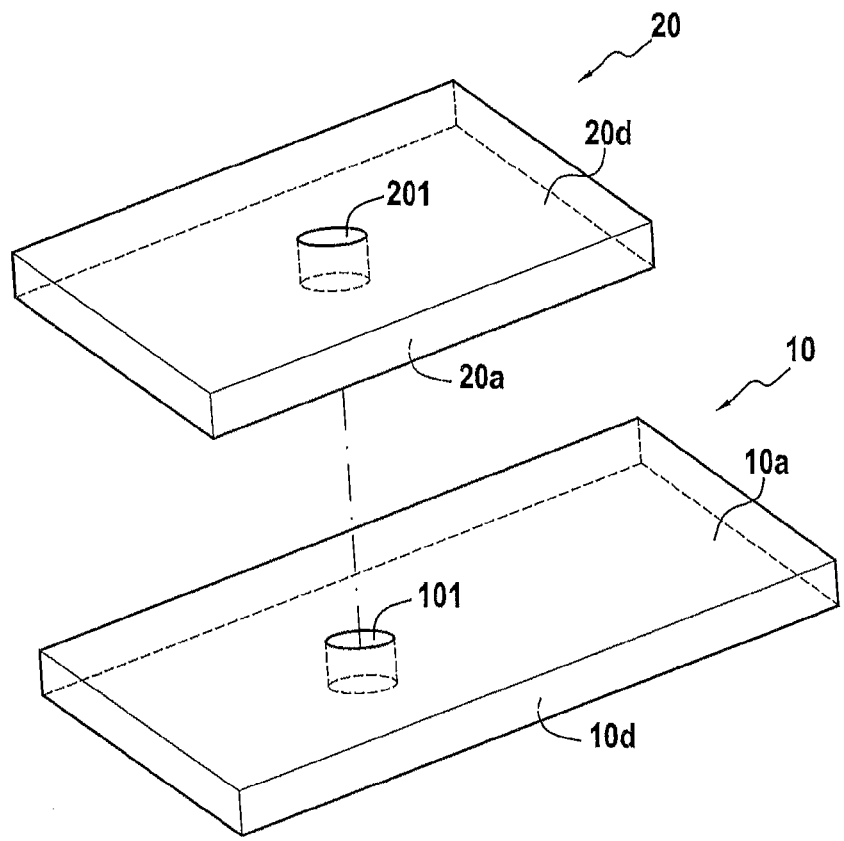
FIGS. 1A to 1E are diagrams showing the brazing of two parts made of ceramic matrix composite material in accordance with an implementation of the invention.

As shown in FIG. 1A, the first step consists in making a perforation in each of the parts 10 and 20. More precisely, in the presently described example, a perforation 101 is machined in the part 10, the perforation 101 extending from the assembly face 10a and opening out into the face 10d of the part 10 that is opposite from the assembly face 10a, and a perforation 201 is machined in the part 20, the perforation 201 extending from the assembly face 20a of the part 20 and opening out into the face 20d opposite from the assembly face 20a. In a variant implementation, one or both of the perforations 101 and 201 do not open out in the face opposite from the assembly face, as for the perforation 901 described below with reference to FIG. 3. Under such circumstances, the height of the peg is adapted to match the depth of the perforations.

Figure 1B:
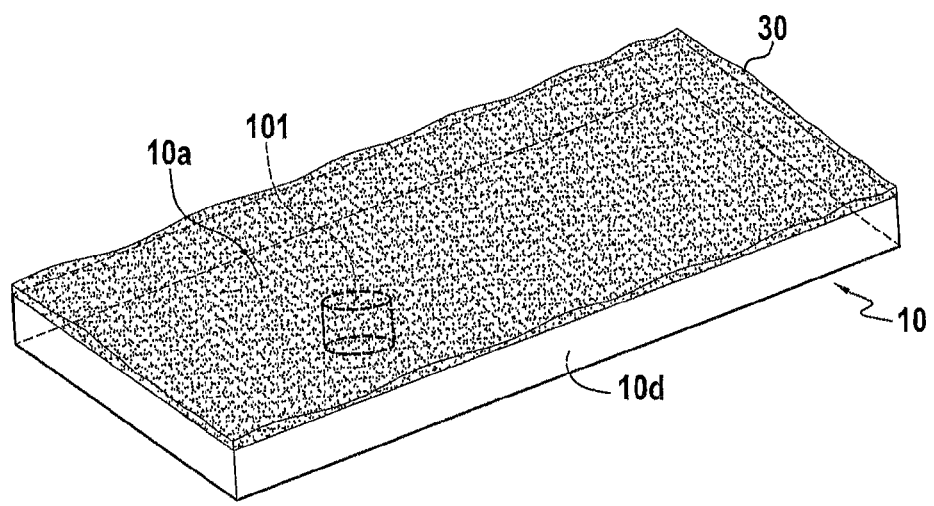

Thereafter, capillary elements, in this example particles of SiC 30, are arranged on the assembly face 10a of the part 10 (FIG. 1B). The particles of SiC are to enable the liquid brazing composition to be conveyed and to diffuse between the two parts 10 and 20 during the brazing operation. It is also possible to use other capillary elements, such as in particular: a web of SiC, a mat of carbon, particles of carbon, or nanotubes of carbon.

Figure 1C:
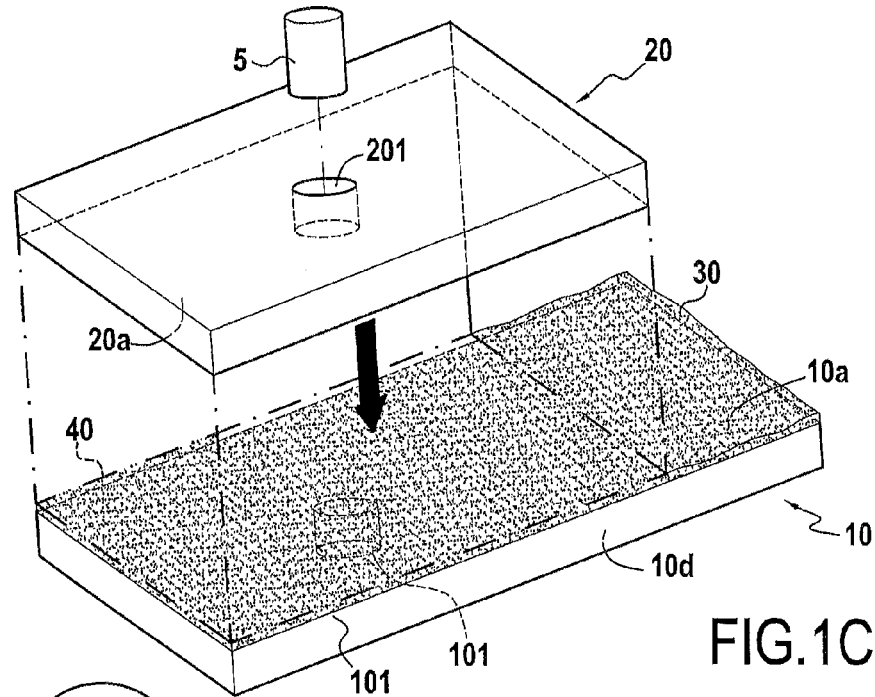

The part 20 is then positioned on the part 10 in such a manner as to cause the assembly faces 10a and 20a to face each other with the perforations 101 and 201 in alignment (FIG. 1C). The zone defined by the union of the facing portions of the assembly faces 10a and 20a corresponds to the brazing zone 40, i.e. the zone where the brazed joint is to be formed.

Figure 1D:
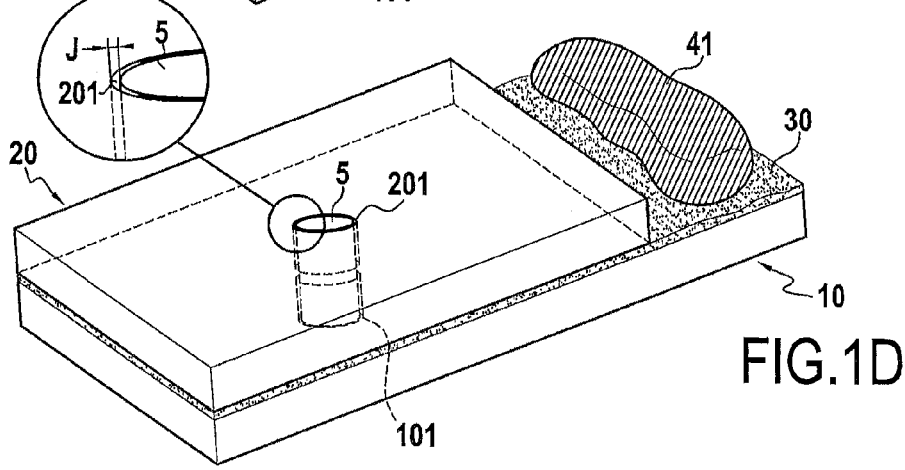

Once the part 20 has been positioned on the part 10, a shear peg 5 is inserted in the perforations 101 and 201 (FIGS. 1C and 1D). A brazing composition 41 in the form of a solid paste is placed on the assembly face 10a outside the brazing zone 40 and in contact with the particles of SiC 30 that are present outside the brazing zone 40. The brazing composition is selected in particular as a function of its compatibility with the composite material of the parts to be assembled together, i.e. it is preferable to choose a composition that has a coefficient of thermal expansion that is close to that of the composite material and that does not react at all with the composite material or that presents controlled reactivity therewith. By way of example, use may be made of compositions based on silicon as described in the following documents: EP 806 402, U.S. Pat. No. 5,975,407, US 2008/190552 and U.S. Pat. No. 7,497,918; of alloys of silicon plus metallic silicides, of silicon plus optionally alloyed germanium, and also of metallic compositions known under the tradenames: Cusil-ABA®, Ticusil®, Incusil®, or Brasic®

It is also possible to use compositions corresponding to mixtures of oxides selected from the following oxides: $SiO_2$, $Al_2O_3$, and MgO.

The following step consists in performing the brazing cycle by raising the temperature so as to make the brazing composition 41 liquid, which brazing composition is then sucked by capillarity by the particles of SiC 30 and spread over the entire brazing zone 40 present between the two parts 10 and 20.

Figure 1E:
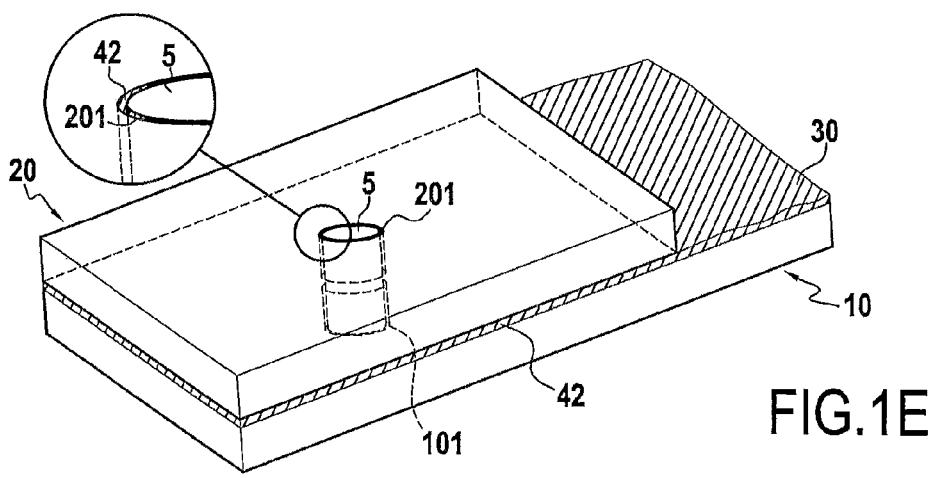

As shown very diagrammatically in FIG. 1E, a brazed joint 42 is thus obtained in contact with the assembly faces 10a and 20a of the two parts 10 and 20.

During the brazing cycle, the brazing composition and the peg react together to form a solid assembly, thus forming an anchor point for the brazed joint in the material of the parts, thereby considerably reinforcing the shear strength of the brazed connection.

Also, clearance J is preferably left between the peg 5 and the perforations 101 and 201 (FIG. 1D), e.g. by making the perforations 101 and 201 with a diameter of 5.2 millimeters (mm) and the peg 5 with a diameter of 4.7 mm. Thus, because of the presence of the clearance J between the peg and the perforations, the gas produced during the brazing cycle is discharged by the perforations 101 and 201 via their portions that open out respectively into the faces 10b and 20b of the parts 10 and 20. This thus limits the formation of pockets of gas in the brazed joint.

The shear peg may be machined out of a material similar to the composite material of the parts for assembling together. The shear peg may also be made out of a material presenting a coefficient of thermal expansion that is sufficiently close to that of the material of the parts for assembling together, i.e. a material having a coefficient of thermal expansion that differs from that of the material of the parts by no more than 40%.

Figure 2:
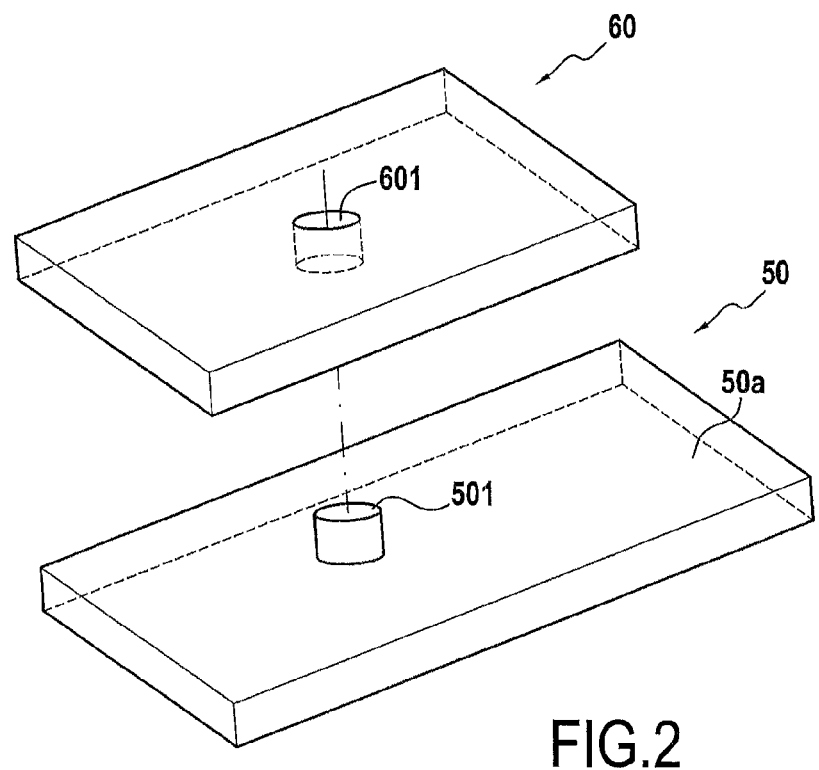
FIG. 2 is a diagrammatic perspective view of two parts for brazing together in accordance with another implementation of the invention.

In a variant implementation of the invention shown in FIG. 2, a shear peg 501 is machined directly on the assembly face 50a of a first composite material part 50 that is to be assembled by brazing with a second part 60, which second part includes for this purpose a perforation 601 forming a housing for the peg 501. The parts 50 and 60 are then brazed together under the same conditions as those described above.

Figure 3:
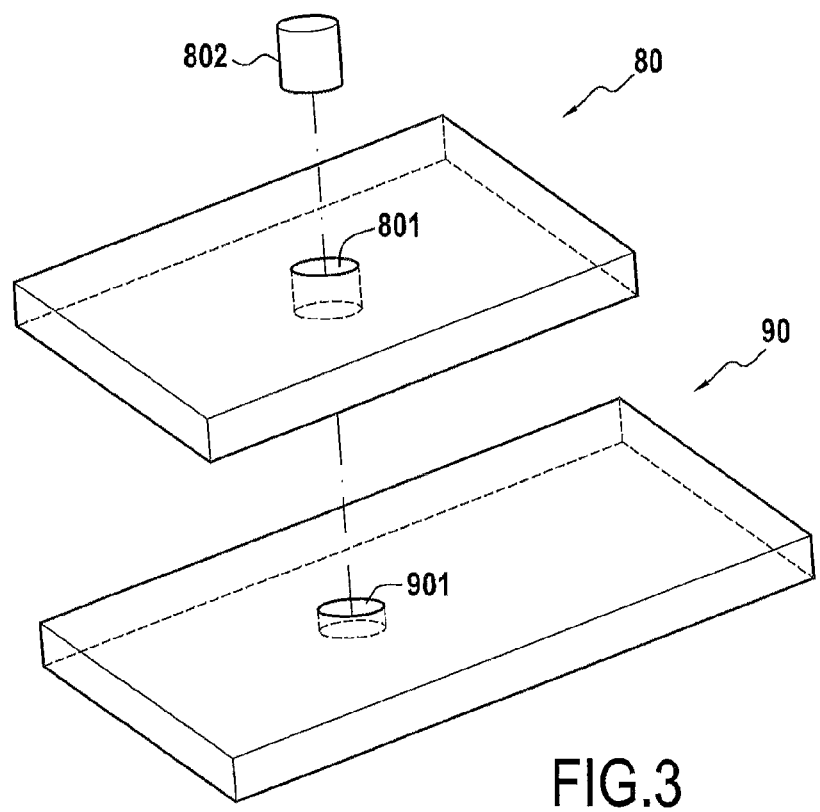
FIG. 3 is a diagrammatic perspective view of two parts for brazing together in accordance with another implementation of the invention.

In another variant implementation of the invention as shown in FIG. 3, the shear peg 802 is inserted into a perforation 801 machined in a first part 80 that is to be assembled by brazing with a second part 90, which second part includes a non-through cavity 901 into which the peg 802 also penetrates. The parts 80 and 90 are then brazed together under the same conditions as those described above.

A plurality of shear pegs may be used for reinforcing a single brazed connection. Under such circumstances, they are inserted in distinct perforations formed in one or both parts, as described above.

Furthermore, one or both of the parts for assembling together by brazing may include cavities in their bonding faces, with at least some of the cavities opening out in portions or faces of the parts that are situated outside the bonding faces.

Figure 4:
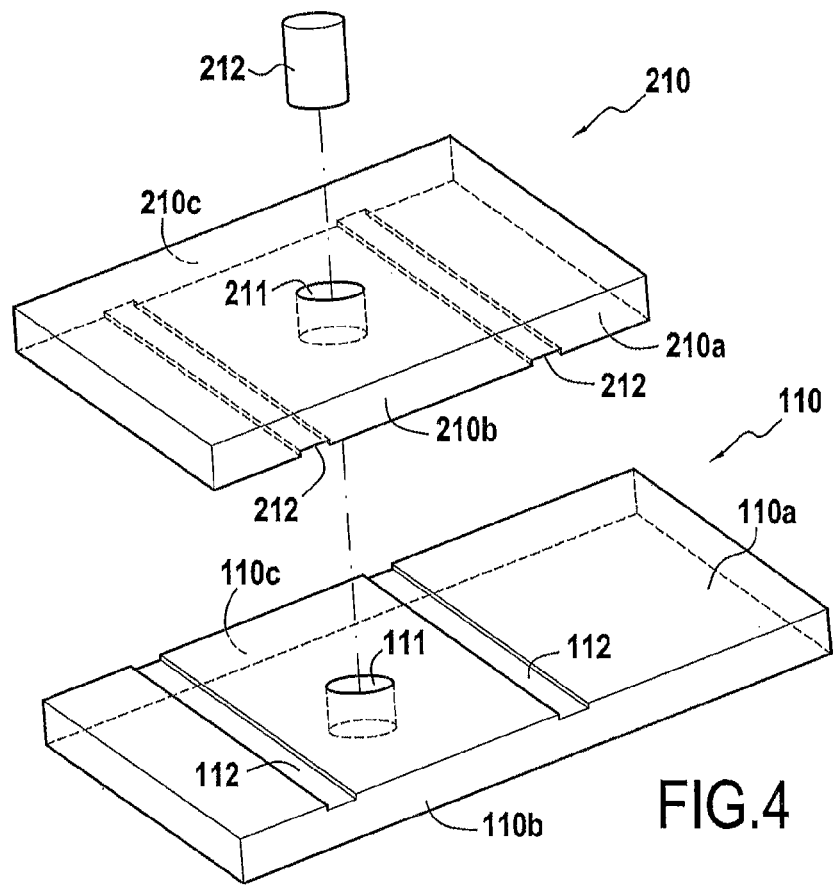
FIG. 4 is a diagrammatic perspective view of two parts for brazing together in accordance with another implementation of the invention.

FIG. 4 shows a variant embodiment of the parts shown in FIG. 1A. In FIG. 4, parts 110 and 210 that are to be assembled together by brazing in accordance with the method of the invention include respectively, like the parts 10 and 20 of FIG. 1A, perforations 111 and 211 forming a housing for a shear peg 212 inserted therein before brazing. The part 110 also has grooves 112 in its assembly face 110a, the grooves opening out in the side faces 110b and 110c of the part 110. Likewise, the part 210 also has grooves 212 in its assembly face 210a, the grooves opening out in the side faces 210b and 210c of the part 210. The grooves 112 and 212 make it possible to form additional anchor portions for the brazed joint in the material of the parts, together with additional paths for degassing and/or visually inspecting the brazed joint. Partial or complete absence of brazing in one or more grooves indicates that the brazed joint has not been formed in uniform manner over the entire brazing zone and that the connection might then include zones of weakness. Depending on the conditions of use of the assembled parts, it is possible to define a number and/or an extent of zones of weakness that can be accepted, below which the brazed joint does not need to be re-worked.

Figure 5:
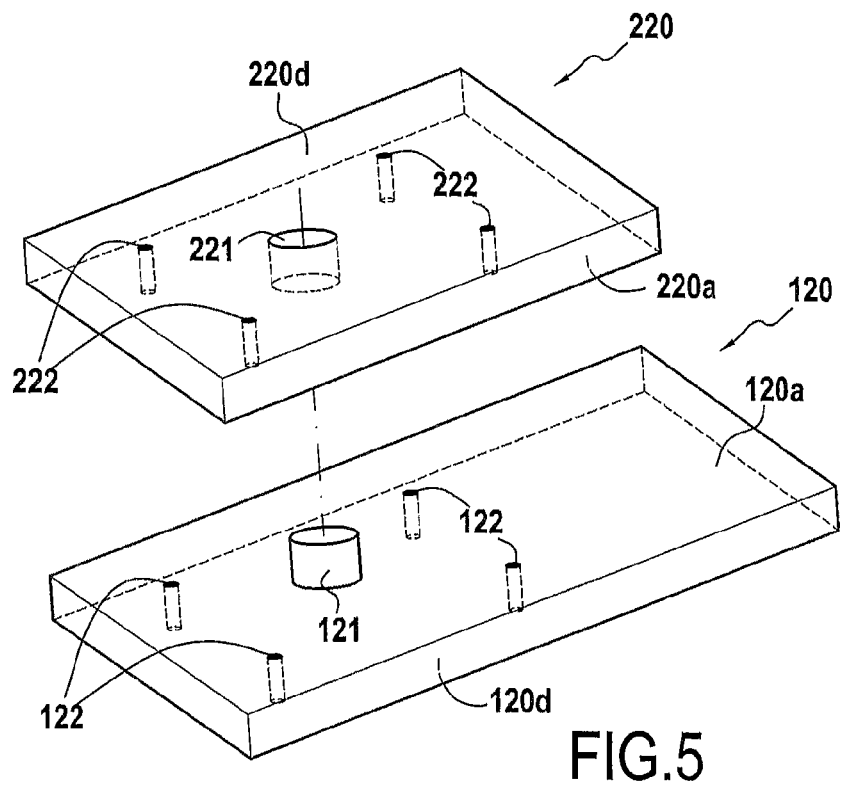
FIG. 5 is a diagrammatic perspective view of two parts for brazing together in accordance with another implementation of the invention.

FIG. 5 shows a variant embodiment of the parts shown in FIG. 2. In FIG. 5, a first part 120 includes a peg 121 on its assembly face 120a, while a second part 220 for assembling by brazing with the part 120 in accordance with the method of the invention includes a perforation 221 that is to form a housing for the peg 121. The part 120 also has orifices 122 in its assembly face 120a, the orifices opening out in the side face 120d opposite from the assembly face 120a of the part 120. Likewise, the part 220 also has orifices 222 in its assembly face 220a, the orifices opening out in the side face 220d opposite from the assembly face 220a of the part 220. The orifices 122 and 222 make it possible to form additional anchor portions for the brazed joint in the material of the parts, together with additional paths for degassing and/or visually inspecting the brazed joint. Partial or complete absence of brazing in one or more orifices indicates that the brazed joint has not been formed in uniform manner over the entire brazing zone and that the connection might then include zones of weakness.

The number, the orientation, the shape, and the dimensions of the grooves or the orifices in each assembly face of the parts made of composite material may be varied. Furthermore, with grooves, the perforations opening out into the face opposite the bonding face of the part may also be machined in the bottoms of the grooves so as to add additional paths for degassing and/or inspecting the brazed joint.

The grooves are preferably oriented in such a manner as to form anchor portions in the brazed joint to oppose the main forces to which the assembly is to be subjected. For example, the grooves may extend in a direction substantially perpendicular to the direction of shear forces. Also, two series of grooves, each extending in different directions, may be formed in the bonding faces of the parts.

The invention claimed is:

1. A method of assembling together by brazing first and second parts made of composite material, each of the first and second parts having an assembly face for brazing with the assembly face of the other part, the method comprising:
   making at least one perforation in the assembly face of the first part;
   interposing capillary elements between the assembly faces of the first and second parts made of composite material;
   placing the first and second parts facing each other while inserting a peg in each perforation of the first part;
   placing a brazing composition in contact with a portion of the capillary elements; and
   applying heat to liquefy the brazing composition so as to cause the molten brazing composition to spread by capillarity between the assembly faces of the composite material parts and to form a brazed joint between the first and second parts, wherein the molten brazing composition and the peg react together to form a solid assembly that forms an anchor point for the brazing joint in the composite material of the first part.

2. A method according to claim 1, wherein clearance is provided between the inside wall of each perforation and the outside wall of the peg inserted in said perforation.

3. A method according to claim 1, wherein at least a first perforation is made in the assembly face of the first part and wherein a second perforation is made in the assembly face of the second part, the first and second perforations being in alignment when the first and second parts are placed facing each other, the peg being inserted in the first and second perforations.

4. A method according to claim 1, wherein the second composite material part includes the peg on its bonding face, the peg being inserted in the perforation of the first part when the first and second parts are placed facing each other.

5. A method according to claim 1, wherein each peg is made out of a material similar to the composite material of the first and second parts.

6. A method according to claim 1, wherein a plurality of grooves are made in the assembly face of at least one of the two composite material parts, at least some of said grooves opening out into one or more faces adjacent to the assembly face of the at least one of the two composite material parts.

7. A method according to claim 1, wherein a plurality of orifices are made in the assembly face of at least one of the two composite material parts, at least some of said orifices opening out into the face opposite from the assembly face of the at least one of the two composite material parts.

8. A method according to claim 1, wherein the capillary elements are selected from at least one of the following elements: particles of SiC, a web of SiC, a mat of carbon, particles of carbon, and nanotubes of carbon.

9. A method according to claim 1, wherein the composite material parts for assembling together by brazing are afterbody parts of an aeroengine.

10. A method according to claim 1, wherein the brazing composition is a metallic composition.

* * * * *